United States Patent [19]

Ilseman et al.

[11] 4,376,970

[45] Mar. 15, 1983

[54] HIGH SPEED DIGITAL POSITION MONITORING SYSTEM

[75] Inventors: Kenneth A. Ilseman; Richard W. Caddell, both of Brookfield, Wis.

[73] Assignee: Kearney & Trecker Corporation, West Allis, Wis.

[21] Appl. No.: 218,488

[22] Filed: Dec. 22, 1980

[51] Int. Cl.$^3$ .................... G05B 19/19; G06F 15/46
[52] U.S. Cl. ................................. 364/167; 364/174; 364/183; 318/603; 318/608; 377/15
[58] Field of Search ............... 364/167, 174, 183, 474, 364/475; 235/92 MP; 318/601, 603, 607, 608

[56] References Cited

U.S. PATENT DOCUMENTS

| | | | |
|---|---|---|---|
| 3,683,345 | 8/1972 | Faulkes et al. | 318/608 X |
| 3,701,888 | 10/1972 | McDaniel | 318/608 X |
| 4,001,558 | 1/1977 | Kelling | 318/608 X |
| 4,023,085 | 5/1977 | Bishop et al. | 318/608 |
| 4,095,158 | 6/1978 | Matsumoto | 318/608 X |
| 4,272,818 | 6/1981 | McDaniel | 364/167 |

*Primary Examiner*—Joseph F. Ruggiero
*Attorney, Agent, or Firm*—Quarles & Brady

[57] ABSTRACT

An electronic control system for a machine tool employs a monitoring system for monitoring the absolute position of a reversibly (and linearly or rotationally) movable moving member in the machine tool. The monitoring system includes a clock, a digital feedback position counter having a predetermined count range, an exciter, a feedback device responsive to movement of the movable member, a digital position storage device, a zero crossing detector, and a zero position counter. The feedback position counter, which operates at a clock frequency, controls the exciter which provides a pulsed exciter signal to the feedback device. The feedback position counter also provides a position count Nc to the position storage device and to the zero position counter. The feedback device provides, through a zero crossing detector, a pulsed feedback signal to the position storage device (and to the zero position counter) and the phase shift between the exciter signal and feedback signal is linearly related to the displacement of the moving member. The position storage device provides a continuously updated position number Np which is also linearly related to member displacement, i.e., the position of the member. The zero position counter typically comprised of a synchronous 4-bit bi-directional binary counter provides a zero position count Nz to the representative of the net number of times the position number Np passes through zero between consecutive samples. A computer, coupled to the position storage device and to the zero position counter, processes the position number Np and the zero position number to unambiguously determine the speed of the moving member.

12 Claims, 12 Drawing Figures

FIG. 5A STATOR 1 EXCITATION SQUARE WAVE 2500 HZ

FIG. 5B FEEDBACK SIGNAL 2500 HZ (WHEN MEMBER STATIONARY)

FIG. 5C PULSE P

FIG. 5D FEEDBACK SIGNAL

FIG. 5E PULSE P

FIG. 6

*MEMBER MOVING IN POSITIVE DIRECTION*

.0048 SECONDS BETWEEN SAMPLE 1 AND SAMPLE 2

FIG. 7

*MEMBER MOVING IN NEGATIVE DIRECTION*

.0048 SECONDS BETWEEN SAMPLE 1 AND SAMPLE 2

FIG. 8

HIGH SPEED DIGITAL POSITION MONITORING SYSTEM

BACKGROUND OF THE INVENTION

This invention relates generally to electronic control systems for apparatus having movable members, such as machine tools or the like. In particular, it relates to control systems including position monitoring systems for monitoring the position of reversibly movable moving members in such apparatus.

DESCRIPTION OF THE PRIOR ART

Some electronic control systems for apparatus such as machine tools employ position monitoring systems to monitor the position of a reversibly movable moving member, such as a linearly movable machine tool slide or table or a rotatable work holder, while the member is in motion and to provide a signal indicative of member position which is usable for control purposes.

One prior art digital position monitoring system employs a digital feedback position counter having a predetermined count range, an exciter, a feedback device connected to be responsive to movement of the movable member, a zero crossing detector, and a digital position storage device. The feedback position counter, which operates at a clock frequency, controls timing of the exciter which provides exciter signals to the feedback device. The feedback position counter also provides a position count Nc to the position storage device. The feedback device, which takes the form of a resolver, provides a pulsed feedback signal to the position storage device and the phase shift between the exciter signal and the feedback signal, which occurs as the member moves, indicates the linear displacement of the movable member relative to a fixed point. The feedback pulse from the feedback device is used to strobe the status (i.e., the position count Nc) of the feedback position count Nc into the position storage device. The position number Np in the position storage device, which is also linearly related to the displacement of the movable member, is repeatedly updated at the frequency of the feedback signal and is sampled by a computer or other device to determine the cumulative displacement of the moving member. Typically, the feedback frequency is chosen to be at least ten times faster than the sample rate.

The prior art digital position monitoring system thus far described has an inherent limitation as regards the speed at which it can accurately track and report the absolute position of the moving member, when the member is moving faster than a certain rate of speed. For example, if the position number, Np, from the position storage device changes between consecutive samples by an amount equal to or greater than one-half the count range of the feedback position counter (which takes the form of an integrated circuit or microprocessor device having a count range limited by the number of its internal gates), the direction of the count change and, therefore, the absolute position of the moving member is ambiguous and cannot be determined without additional information.

SUMMARY OF THE PRESENT INVENTION

The present invention provides an electronic control system for apparatus, such as an automated machine tool or the like, which includes a position monitoring system for continuously monitoring a moving member, such as a linearly movable tool slide or table or a rotatable work holder, which member is movable in opposite directions at various speeds, to determine the absolute position of the member relative to a point. The position monitoring system includes the following components: a clock, a feedback position counter having a predetermined count range, an exciter, a feedback device in the form of a resolver connected to be responsive to movement of the movable member, a zero crossing detector, a position storage device, a zero position counter, and a computer or other device for determining the absolute position of the movable member. Preferably, the aforesaid components take the form of integrated circuit or microprocessor devices.

In operation, the feedback position counter, which counts continuously at the clock frequency, controls timing of the exciter which provides an excitation signal through an amplifier to the feedback device. The feedback position counter also provides a position count Nc to the position storage device and to the zero position counter. The feedback device provides a pulsed feedback signal to the position storage device and to the zero position counter. The phase shift of the pulsed feedback signal relative to the pulsed excitation signal is linearly related to the displacement of the movable member. The pulsed feedback signal strobes the status of the feedback position counter (i.e., the position count Nc from the feedback position counter) into the position storage device. The position number Np in the position storage device is, therefore, linearly related to the displacement of the movable member, i.e., directly proportional to the orientation of the moving portion of the resolver relative to its stationary portion. The frequency of the feedback signal is equal to the excitation frequency only when the position of the moving portion of the resolver is not moving. While the position is changing, the feedback signal frequency is either greater or less than the excitation frequency, depending on the direction of movement. The frequency difference is directly proportional to the rate of position change. The position number Np in the position storage device is repeatedly and continuously updated at the frequency of the feedback signal. The computer periodically samples the position number Np, and in accordance with the difference between successively sampled position numbers, the computer determines the cumulative displacement of the moving member. Typically, the frequency of the feedback signal is chosen to be at least ten times faster than the sampling rate.

When the speed of the movable member exceeds a predetermined speed, the speed at which the difference between consecutively sampled position numbers Np is equal to or greater than one-half the predetermined count range of the feedback position counter, the zero position counter serves to resolve any ambiguity as to the direction of the moving member. The zero position counter typically takes the form of a 4-bit bi-directional counter and is supplied from the zero crossing detector with signal indicative of the zero crossing of the feedback signal from the feedback device.

The zero position counter determines the net number of times the position number Np passed through a least significant number, such as zero, between successively sampled position numbers Np and provides a zero position count Nz to the sampling computer. With the position number Np and the zero position count Nz, the sampling computer operates so that any ambiguity between successively sampled position numbers Np is resolved, the direction of movement of the movable member is ascertained, and the absolute cumulative position of the movable member is determined.

A position monitoring system in accordance with the present invention offers several advantages over the prior art. For example, it substantially increases the speed of a moving member which can be monitored by systems which otherwise have an inherent limitation in this regard because of count and direction ambiguities which arise at higher speeds. It raises the ultimate velocity limit which can be monitored to a level so high that it is irrelevant and of no importance to known practical feedback devices and systems. It employs commercially available, relatively low-cost integrated circuit or microprocessing devices to provide results which could otherwise be obtained only by using a substantially more complex and expensive feedback position counter devices. It is adaptable as a retrofit to feedback-type position monitoring systems already in use in the field, as well as to factory-installed systems. Other objects and advantages of the invention will hereinafter appear.

DESCRIPTION OF A PREFERRED EMBODIMENT

Figure 1:
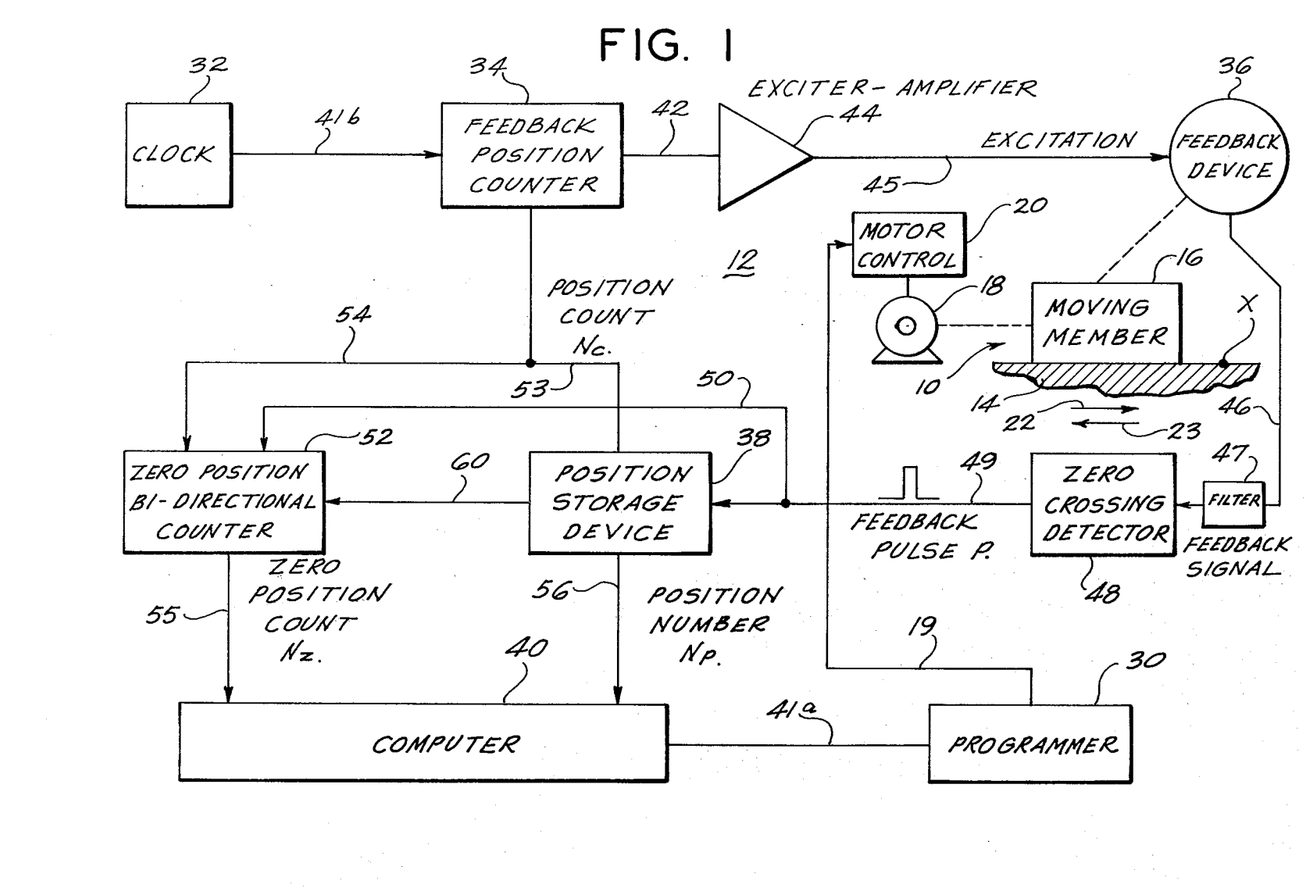
FIG. 1 is a schematic diagram of an electronic control system for a machine tool, which includes a position monitoring system in accordance with the invention for a movable member in the machine tool.

FIG. 1 schematically shows portions of an automated machine tool 10 and portions of an electronic control system 12 in accordance with the invention for monitoring and controlling certain functions of the machine tool. Those portions of machine tool 10 which are shown in FIG. 1 include a fixed or stationary bed 14 having a movable member or component 16, such as a tool slide or table, slidably mounted thereon. Member 16 is linearly movable in opposite directions at desired variable speeds and for desired variable distances by means, for example, of a reversible variable speed electric motor 18. Member 16 is movable in the directions of the arrows 22 and 23 toward and away from, respectively, a point X on bed 14 as required during particular machining operations. Member 16 may, for example, be moved at speeds on the order of up to 800 inches per minute or more and may, for example, undergo direction reversals at various programmed intervals. It is to be understood that, although member 16 is shown moving linearly, the invention is also applicable to members which rotate.

The electronic control system 12 generally includes a motor-reversing speed-controlling motor contactor or controller 20 for motor 18; and a programmer 30 which is connected to motor controller 20 by a line 19 to effect operation of motor 18 and thus control the direction and speed of movement of member 16 in accordance with a predetermined program which governs the operation of the programmer.

The electronic control system 12 further includes a position-monitoring system, hereafter described, for monitoring and determining the absolute cumulative position of movable member 16, i.e., its position relative to point X, while the member is in motion and for providing this position information in appropriate form from a computer 40 through a line 41a to programmer 30 for control purposes.

The position monitoring system shown in FIG. 1 generally includes a clock 32, a feedback position counter 34, an exciter-amplifier 44, a feedback device 36, a filter 47, a zero crossing detector 48, a position storage device 38, a zero position counter 52, and a sampling computer 40. The clock 32 takes the form of a crystal oscillator operable at a desired frequency. The feedback position counter 34 takes the form of an integrated circuit or microprocessor device having a predetermined count range, i.e., for example, from 0 to 4095, or a total of 4096 counts. The feedback device 36 takes the form of a resolver or an Inductosyn device which is mechanically connected to be responsive to movement of moving member 16. The position storage device 38 takes the form of an integrated circuit or microprocessor device such as a 12-bit binary latch circuit device. The filter 47, the zero crossing detector 48, and the zero position bi-directional counter 52 are hereinafter described in detail. The sampling computer 40 determines the absolute position of movable member 16 while the latter is in motion and supplies this information in appropriate signal form to programmer 30 on line 41a.

The feedback position counter 34, which is connected by line 41b to clock 32, counts continuously at the clock frequency and controls (through line 42) the timing of exciter-amplifier 44 which provides excitation signals through a line 45 to feedback device 36. Feedback device 36 provides a feedback signal through line 46 and filter 47 to zero crossing detector 48. In response to a negative going zero crossing of the feedback signal, zero crossing detector 48 provides a pulsed output signal, hereinafter referred to as the feedback pulse, through a line 49 to position storage device 38 and through a line 50 to zero position bi-directional counter 52.

Feedback position counter 34 provides a position count signal Nc through a line 53 to position storage device 38 and through a line 54 to zero position bi-directional counter 52. The phase shift of the feedback signal pulse on line 49 relative to the pulsed excitation signal on line 45 is linearly related to the physical displacement of the feedback device 36 and member 16 relative to point X. The pulsed feedback signal on line 49 "strobes" the status of feedback position counter 34. In other words, at the time of receipt of the feedback pulse, the count of feedback position counter 34 is latched or stored in position storage device 38 as the position number Np. The position number Np in position storage device 38 and available on line 56 is linearly related to the displacement of feedback device 36 and movable member 16. The position number Np in position storage device 38 is repeatedly updated at the frequency of the feedback pulse signal incoming on line 49 and is sampled periodically by computer 40 on line 56 to determine the cumulative displacement of moving member 16. Typically, the frequency of the feedback signal on line 46 is chosen to be ten times faster than the sampling rate of computer 40.

Figure 2:
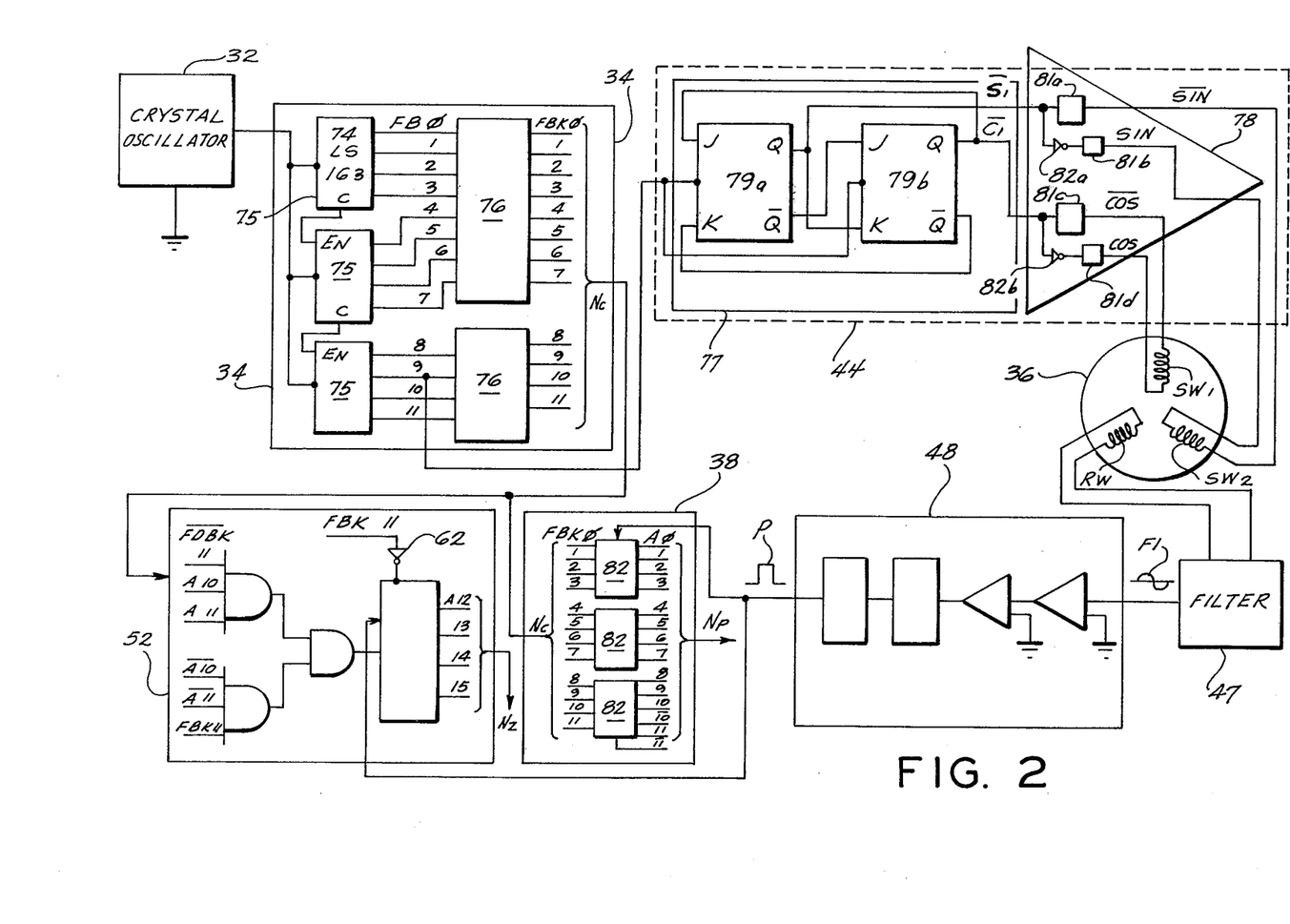
FIG. 2 is an electric circuit diagram of a portion of the position monitoring system shown in FIG. 1.

FIG. 2 is a more detailed depiction of portions of the circuit shown in FIG. 1 and shows, for example, components and circuit connections in an actual embodiment of the invention which was constructed and operated. It is to be understood, of course, that specific components hereinafter described in connection with FIG. 2 are for purposes of example and that other comparable devices could be employed.

In FIG. 2, clock 32 takes the form of a crystal oscillator such as a CTS Knights MXO-40 device.

Feedback position counter 34 is comprised of a 12-bit binary counter which, in the presently preferred embodiment, is configured of three Texas Instrument Model 74LS163 synchronous counters, each designated 75, and a pair of Texas Instrument Model 74S241 buffer line drivers, each designated as 76. Buffer line drivers 76 isolate counters 75 from any noise on line 42 and further increase the number of devices that can be driven by counters 75. Counters 75 count continuously at a constant rate and output a 12-bit binary number (on lines FB∅ through FB11) ranging from 0 to $4095_{10}$ to buffer line drivers 76. The third most significant bit of this 12-bit binary number is also supplied on line FB9 to exciter-amplifier 44. Buffer line drivers 76 output this 12-bit binary number (on lines FBK∅ through FBK11) to the position storage device 38.

Exciter-amplifier 44 is comprised of a sine/cosine generator 77 and an amplifier 78. Sine/cosine generator 77 is comprised of a pair of J-K flip-flops 79a and 79b which are typically configured on a single monolithic chip such as a Texas Instrument Model 74LS107 chip. Flip-flops 79a and 79b are connected to each other with the J and K inputs of flip-flop 79a coupled to the Q and $\overline{Q}$ outputs, respectively, of flip-flop 79b. The J and K inputs to flip-flop 79b are coupled to the $\overline{Q}$ and Q outputs, respectively, of flip-flop 79a. With flip-flops 79a and 79b connected to each other in this manner, flip-flop 79b produces an output signal $\overline{C1}$ at its Q output that is phase shifted 90° from the output signal $\overline{S1}$ produced at the Q output of flip-flop 79a after receipt of a clock signal by each flip-flop.

Amplifier 78 is comprised of four peripheral drivers 81a to 81d, respectively, each peripheral driver typically being configured of a Texas Instrument Model 75450 driver. The input to each of drivers 81a and 81c is coupled to the Q output of a separate one of flip-flops 79a and 79b, respectively. The input to each of drivers 81b and 81d is coupled through a separate one of inverters 82a and 82b to the Q output of a separate one of flip-flops 79a and 79b, respectively. Stator winding SW1 of feedback device 36 is coupled across the output of drivers 81a and 81b, and in a similar manner, winding SW2 is coupled across the output of drivers 81c and 81d.

As FIG. 2 shows, the feedback device 36 takes the form of a resolver which is a rotary transformer with the aforementioned two primary stator windings SW1 and SW2 on a stator S and one secondary rotor winding RW on a rotor R. The primary stator windings SW1 and SW2 are wound and arranged to be orientated 90° from each other. When the stator windings SW1 and SW2 are energized from exciter-amplifier 44 with the two a.c. voltages that are of equal amplitude but are phase shifted 90° from each other, the phase of the fundamental component of the rotor voltage in winding RW (relative to either stator voltage) will be directly proportional to the rotational position of the rotor. The phase of the rotor voltage fundamental component will shift through 360° as the rotor is turned through one revolution. Thus, if the rotor is mechanically coupled to the shaft of the drive motor 18 of member 16, the member position can be determined by measuring the phase shift of the rotor voltage fundamental component relative to either of the stator voltages. Typically, the gear ratio between the motor and the resolver 36 is such that one revolution of the resolver corresponds to a slide motion of 0.1″, 0.2″, 2 mm, or some other convenient dimension. In a preferred embodiment, feedback device 36 takes the form of an Inductosyn (Registered Trademark) device manufactured by and available from Farrand Controls, Inc., Inductosyn Corporation, New York, N.Y., and described in that company's printed publication entitled "Inductosyn-Principles and Applications".

A rotary Inductosyn device (not shown) can be considered as a multi-turn (multi-speed) resolver, that is, every revolution of the rotor causes the phase of the rotor voltage fundamental component to shift some multiple number of 360° if the stator windings SW1 and SW2 are energized, as previously described. Typical multiples for rotary Inductosyns are 128, 180, 256, 360 and 1000. Rotary Inductosyn devices are used for rotary motion measurements which require a high degree of accuracy.

A linear Inductosyn device (not shown) can be considered as a rotary Inductosyn device that has been unrolled. The slider and scale of the linear Inductosyn device correspond to the stator and rotor, respectively, of the rotary device. Similarly, linear Inductosyn devices are used in linear applications requiring high accuracy. These devices are available in versions in which a 360° phase shift in the scale corresponds to a motion of 0.1″, 0.2″, 2.0 mm or 4.0 mm.

The feedback signal from an Inductosyn rotor or scale type device is quite low, and therefore, a preamplifier (not shown) is required to raise this signal to a usable level.

Figures 5A, 5B, 5C:
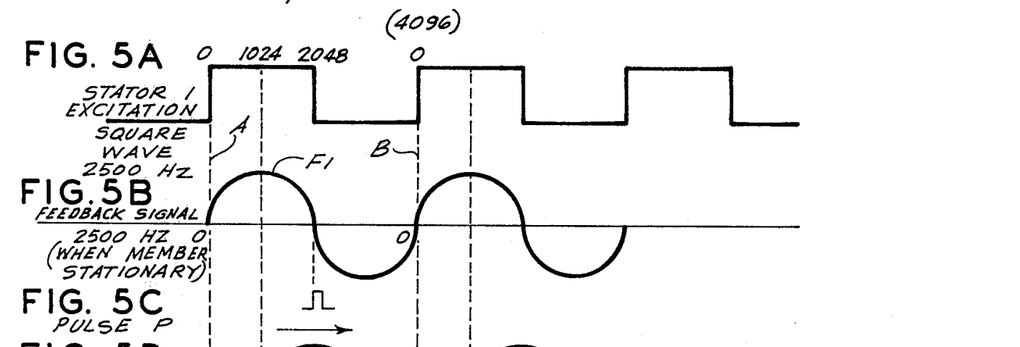
FIGS. 5A through 5E are graphs depicting electrical conditions and wave forms occurring in the feedback device of FIG. 3 under different operating conditions.
Figure 5D:
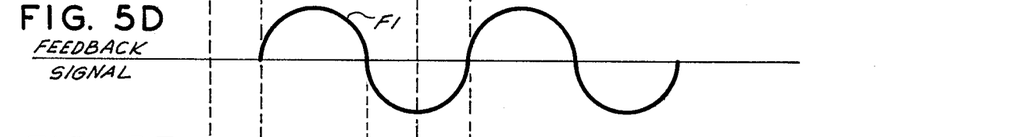
Figure 5E:
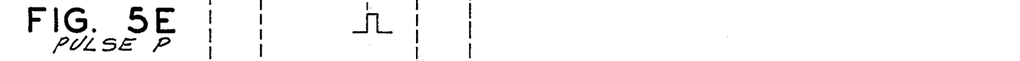

As FIG. 2 makes clear, the filter 47 receives the output signal from rotor winding RW of feedback device 36 and passes only the fundamental component thereof (signal F1 in FIGS. 2, 5B and 5D) to the zero crossing detector 48. The zero crossing detector 48 outputs a feedback strobe pulse P to position latches in the position storage device 38 and to the zero position counter 52. Position storage device 38 is shown as a 12-bit storage device comprised of three Texas Instrument Model 74L175 quadruple D-type flip-flops with clear, each designated 82. The excitation signal to stator winding SW1, for example, takes the form of a square wave, as shown in FIG. 5A, and the duration of one of the pulses (between the dashed lines designated A and B) is 4096 counts. The feedback signal from feedback device 36 after filtering, takes the form of a sine wave, as shown in FIG. 5B. The zero crossing detector 48 operates to provide a pulse signal P, shown in FIG. 5C, which corresponds to the negative going zero crossing of the filtered feedback signal (compare FIGS. 5A, 5B, 5C) and performs the functions hereinafter described. It is to be noted that FIGS. 5A, 5B and 5C together depict a condition wherein the member 16 is stationary. FIGS. 5A, 5D and 5E considered together depict a condition wherein member 16 is moving and a phase shift of the filtered feedback signal (FIG. 5D) relative to excitation signal (FIG. 5A) results in a shift of the pulse signal (FIG. 5E) relative to the excitation signal.

The pulse signal P of FIGS. 5C and 5E performs the following functions: The pulse strobes the current count Nc in the 12-bit feedback position counter 34 into position storage device 38. The position storage device outputs the current count as the position number Np to computer 40. The pulse P also enables the zero position counter 52 which keeps track of the number of times and in which direction the position of the resolver 36 goes through 0, and hence, the number of times and in which direction the position number Np goes through 0. With this information, the system can track a much higher feedback velocity than would otherwise be possible without resorting to more complex means.

At speeds equal to or greater than a predetermined speed, the speed at which the change in consecutively sampled position numbers equals one-half of the count range of feedback position counter 34, the information provided by zero position counter 52 in the form of a zero position count aids computer 40 in the determination of the direction of movement of moving member 16 as follows.

Figure 6:
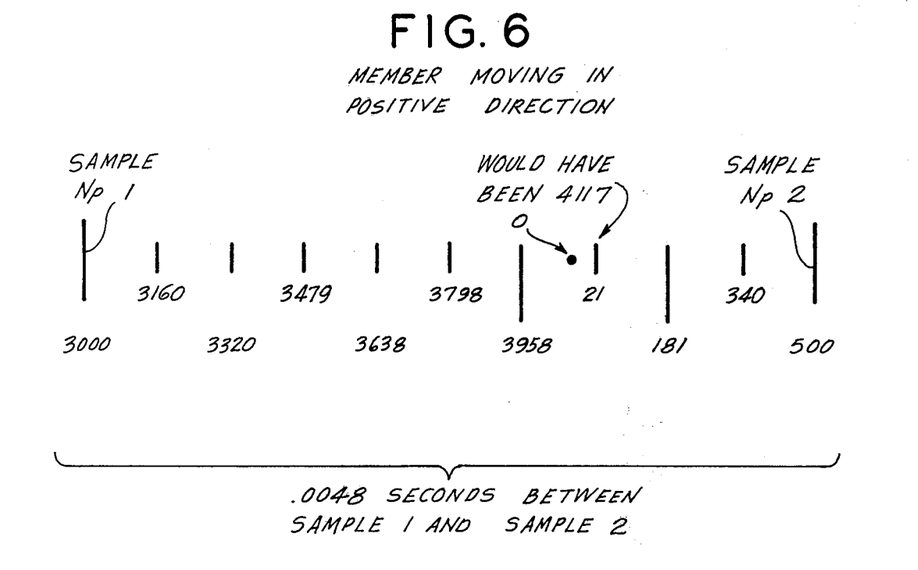
FIG. 6 is a schematic depiction of a count sequence between samples when the member is moving in the positive direction.
Figure 7:
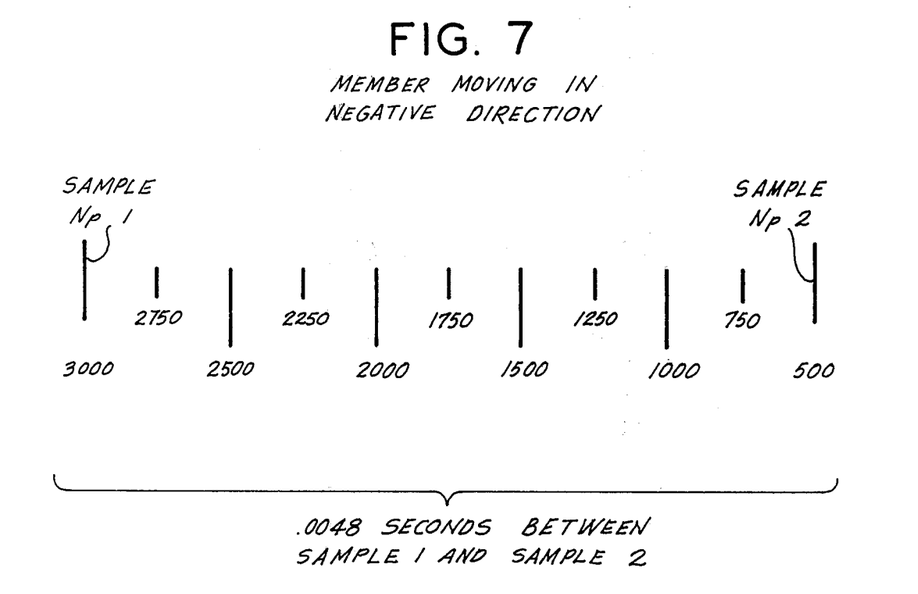
FIG. 7 is similar to FIG. 6 but shows a count sequence when the member is moving in the negative (opposite) direction.

Referring to FIGS. 6 and 7, the graphs therein illustrate the problem of ambiguity that can arise between consecutive samples if the direction of movement of member 16 is unknown and its speed is such as to cause the feedback signal (FIG. 5D) to shift so that the zero crossing pulse P (FIG. 5E) has shifted half the count range or greater. To circumvent this problem, the zero crossing detector 48 receives the feedback signal on line 46 from feedback device 36 and provides the signal P on lines 49 and 50 to the zero position bi-directional counter 52, which takes the form of a 4-bit bi-directional binary counter shown in detail in FIGS. 2 and 3. Each time the position number Np passes through a least significant number, such as zero, the zero position counter 52 will either increment by one or decrement by one depending on whether Np passed through the least significant number in the position or negative direction, respectively. Thus, the zero position count Nz, which is provided on line 55 to computer 40, is indicative of the net number of times (and in which direction) the position number Np passes through the least significant number.

Figure 3:
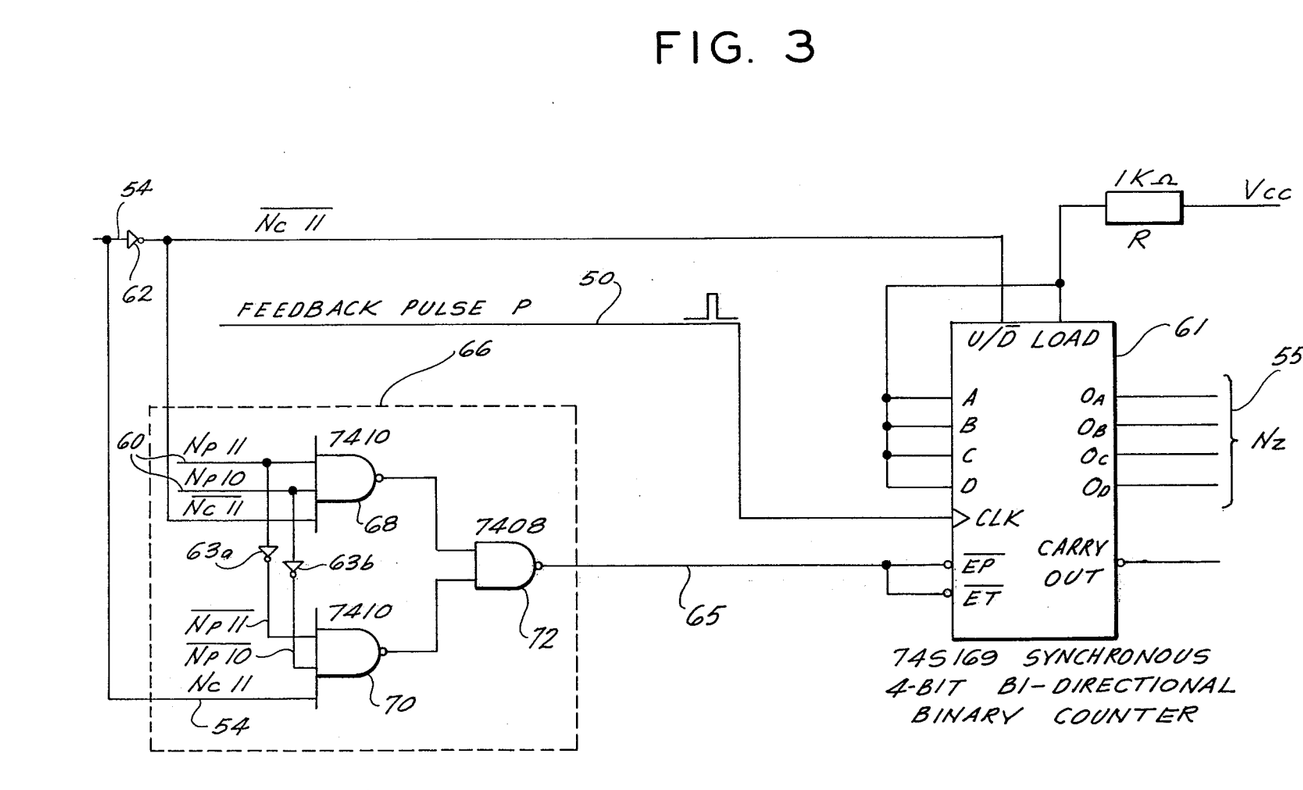
FIG. 3 is an enlarged view of a portion of the circuit diagram of FIG. 2.
Figure 4:
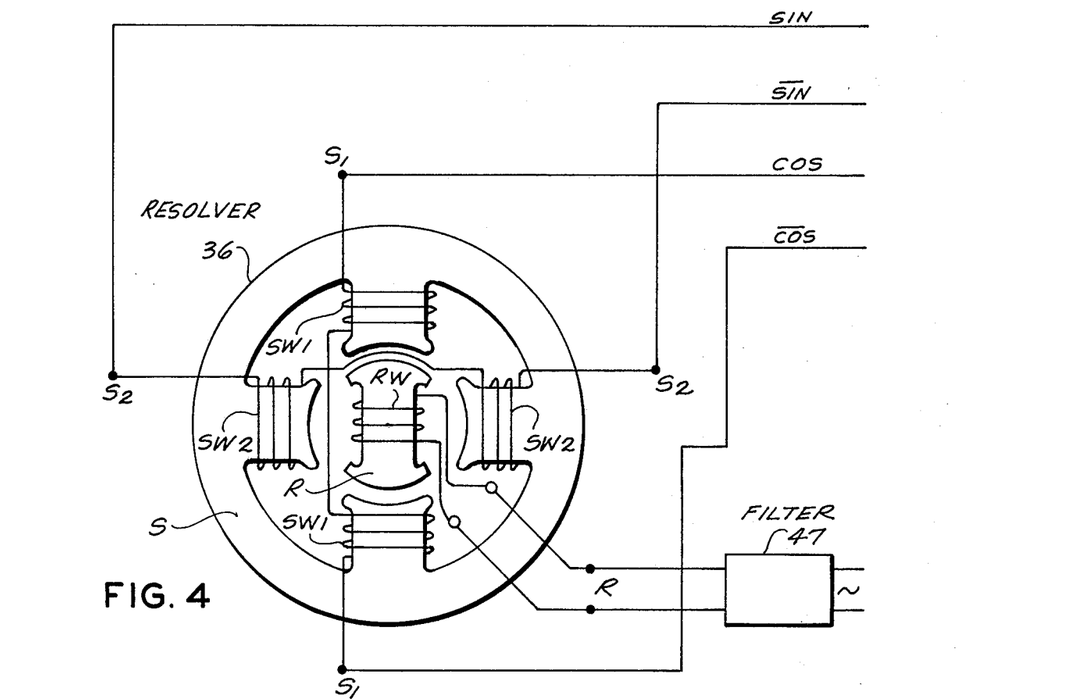
FIG. 4 is an enlarged and more complete circuit diagram of the feedback device or resolver shown in FIGS. 1 and 2.

Referring to FIGS. 1, 2 and 3, these zero transitions of position number Np are detected by the zero position bi-directional counter 52 as follows. The zero position count Nz on line 55 from counter 52 is updated by each successive feedback pulse on line 50 from feedback device 36 by comparing in counter 52 the last previous position number Np incoming on line 60 from position storage device 38 to the current position count Nc incoming on line 54 from feedback position counter 34. Thus, each zero transition of position number Np will cause zero transition number Nz on line 55 to increment or decrement by one, depending on the direction of the zero transition. With the zero position counter 52 added to the basic feedback count, the ultimate velocity limitation of a position monitoring system is so high that it is irrelevant as to limitation to practical feedback systems.

Zero position counter 52 is required for the following reason. Due to the predetermined count range of feedback position counter 34, a system using the same has an inherent limitation with respect to its ability to monitor accurately the position of member 16, if and when the member 16 is moving at or above a predetermined rate of speed, unless compensation is made therefor. For example, as FIGS. 6 and 7 make clear, if the position number Np changes between consecutive samples by an amount equal to or greater than one-half of the range of the feedback position counter 34, the direction of the change, and therefore, the absolute position of the moving member 16 cannot be determined without additional information. This can be better understood by considering the following examples designated 1 and 2.

Example 1, depicted in FIGS. 6 and 7, assumes the following conditions:

Count range of feedback position counter 34 = 4096 (0–4095)

$Np_1$ = Position number for first sample taken from storage device 38 = 3000

$Np_2$ = Position number for second sample taken from storage device 38 = 500

(Note: An increasing number corresponds to movement in a positive (+) direction).

If the assumed change in position number Np between consecutive samples is less than half the count range of the position counter 34, that is, less than 2048 counts as explained above, then Np must have changed from 3000 through 0 to 500 in the positive (+) direction (net change = 4096 − 3000 + 1596), and not 3000 to 500 in the negative (−) direction (net change = 3000 − 500 = 2500). Thus, the motion of the moving member 16 between samples must have been in the positive (+) direction. If the above assumption cannot be made, then the direction of the motion and the absolute position of the member 16 cannot be determined without additional information.

The limiting velocity $V_{lim}$ of the moving member 16 is defined by the following formula:

$$V_{lim} = \frac{\frac{CR}{2} - 1}{Ts} \times D$$

Where
CR = Count range of the feedback position counter 34

Ts = Time between consecutive samples

D = Displacement of the moving member 16 per one count of the feedback position counter.

Example 2. Calculate $V_{lim}$ for a machine tool axis slide given the following position feedback parameters:

Let the count range CR = 4096 (0 through 4095)

Ts = 0.004 of a second

360° of feedback phase shift = 0.1 of an inch

D = 0.1 of an inch/4096 = 0.000024441 of an inch.

Therefore, $$V_{lim} = \frac{\frac{4096}{2} - 1}{.004 \text{ sec.}} \times \frac{.1 \text{ of an inch}}{4096} \times \frac{60 \text{ seconds}}{\text{minute}}$$

or, $V_{lim}$ = 749.6 inches per minute.

In Example 1, had it been known that position number Np did not pass through zero between the samples, a net change of 2500 (3000 to 500) in the negative (−) direction could have been determined, even though 2500 is greater than one-half of the count range of the feedback position counter 34. In general, if the net number of position number Np transitions through zero between consecutive samples is known, the velocity limitation $V_{lim}$ described in the preceding paragraphs no longer exists.

Referring again to FIGS. 1, 2 and 3, there is shown a preferred embodiment of a zero position counter 52. In FIG. 3, the zero position counter 52 is comprised of a synchronous 4-bit bi-directional binary counter 61, such as a Model 74S169 type device manufactured by Texas Instruments, Inc., Dallas, Tex., and described in detail in that company's Bulletin No. DL-S 7612068, October 1976, and especially on page 7-226 thereof, which is herein incorporated by reference.

Counter 61 has its clock terminal CLK connected to receive the feedback pulse from line 50. The up/down input of counter 61, designated U/$\overline{D}$, is coupled through an inverter 62 and line 54 to line FBK 11 of drivers 76 of feedback position counter 34, illustrated in FIG. 2. Referring now to FIG. 2, line FBK 11, one of the twelve lines of drivers 76 carries bit Nc11, which bit is the most significant one of the twelve bits comprising position count Nc. Inverter 62 inverts the logical state of bit Nc11, thus supplying counter 61 with bit $\overline{Nc11}$.

Counter 61 has its data input terminals designated A, B, C and D connected through a resistor R to a voltage source designated Vcc. Counter 61 also has its load terminal designated LOAD connected through resistor R to voltage source Vcc.

Counter 61 has its data output terminals designated $O_A$, $O_B$, $O_C$ and $O_D$ connected to provide output signals representative of the net zero crossing count Nz on line 55 to computer 40. The counter has its count enable terminals designated EP and ET, both connected to an output line 65 from a logic circuit 66 designated by the dashed line in FIG. 3.

Logic circuit 66 is comprised of two three-input NAND gates 68 and 70, respectively, each NAND gate being typically comprised of a Model 7410 NAND gate, such as manufactured by Texas Instruments. NAND gate 68 is coupled at its first input through inverter 62 to line 54, allowing NAND gate 68 to be supplied with bit $\overline{Nc11}$. NAND gate 70 is coupled at its first input to line 54 directly, so that NAND gate 70 is supplied with bit Nc11. The second and third inputs of NAND gate 68 are coupled through line 60 to the lines A10 and A11 of latches 82 of position storage device 38 so that NAND gate 68 is supplied with bits Np10 and Np11, respectively, which are the second most significant and the most significant bits, respectively, of the position number Np. Each of a pair of inverters 63a and 63b couples a separate one of the second and third inputs of NAND gate 70 to the second and third inputs, respectively, of NAND gate 68 so that NAND gate 70 is supplied with bits $\overline{Np10}$ and $\overline{Np11}$ which are the logical inverse of bits Np10 and Np11, respectively.

Figure 8:
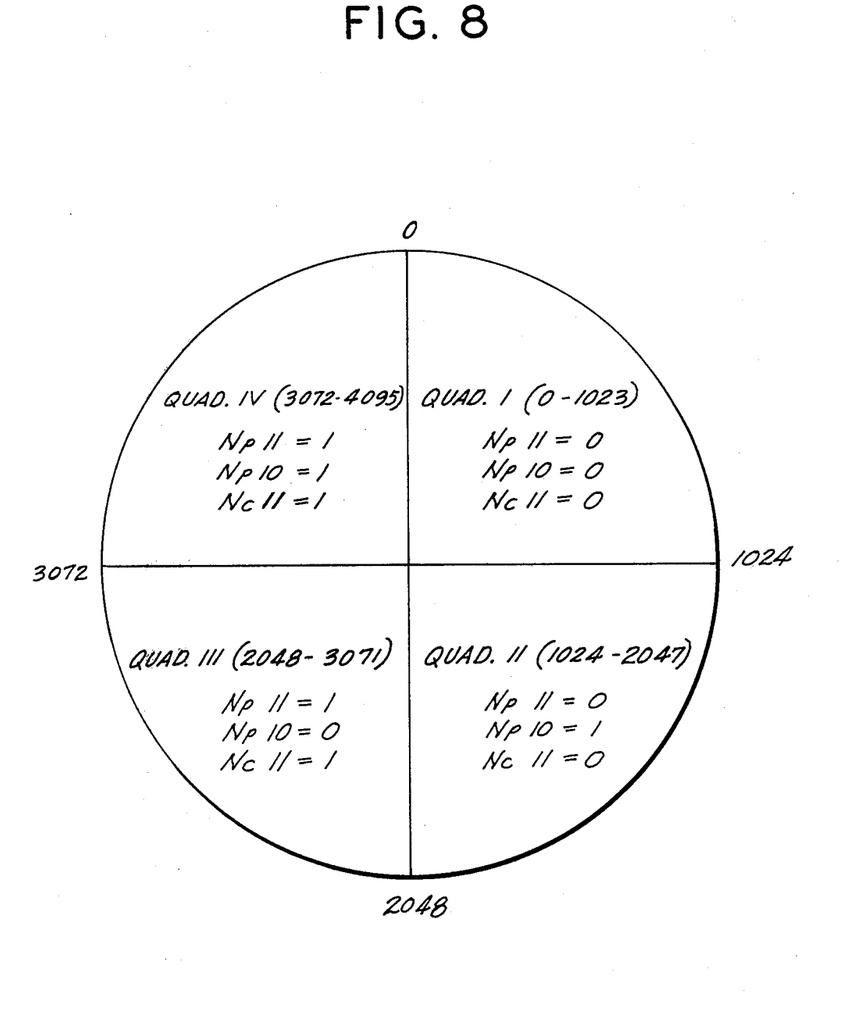
FIG. 8 is a diagram which depicts operation of the control system and electric circuit diagram shown in FIGS. 1 and 2.

The diagram in FIG. 8 illustrates the operation of the circuit shown in FIGS. 1, 2 and 3. The range of the feedback position counter 34 is divided into four quadrants. Assume that the first of two consecutive feedback pulses occurred in Quadrant IV and the second occurred in Quadrant I. The second feedback pulse causes the zero crossing number Nz to increment by 1 because of the condition Np11·Np10·$\overline{Nc11}$=1, indicating that position number Np had passed through zero in the clockwise (positive) direction. Similarly, had the first feedback pulse occurred in Quadrant I and the second feedback pulse in Quadrant IV, the zero crossing number Nz would have decremented by 1 because of the condition $\overline{Np11}$·$\overline{Np10}$·Nc11=1, indicating that position number Np had passed through zero in the counterclockwise (negative) direction.

The zero position counter 52 disclosed can operate correctly only if the velocity of the moving member 16 is limited to a rate that corresponds to a difference of 1024 counts in consecutive values of Np ($\Delta$Npmax). Should that rate be exceeded, some transitions of position number Np through zero will be lost and the system will lose track of the moving member 16. However, this velocity restriction is not a serious limitation. If the zero position counter circuit 52 hereinbefore described were added to a system such as described in Example 2, and the excitation frequency were 2500 Hz, the maximum tracking velocity of the number 16 would increase from 749.6 to 3000 inches per minute. If the excitation frequency were 5000 Hz, the maximum tracking velocity of member 16 would increase from 749.6 to 6000 inches per minute.

The zero position counter circuit 52 hereinbefore described can be modified to increase $\Delta$Npmax, and therefore, the maximum tracking velocity by using more complex circuits to control the U/$\overline{D}$, $\overline{ET}$ and $\overline{EP}$ inputs of the counter 61.

It should also be noted that the present invention is not limited to applications where zero is the least significant number in the feedback position counter 34. It is only necessary that the transitions of Np through the least significant number be bi-directionally detected.

Although the illustrative embodiment of the invention has been described in detail for the purpose of disclosing a practical operative invention, many modifications and changes will occur to those skilled in the art. It is therefore intended to cover all such modifications and changes as fall within the true spirit of the invention as defined in the subjoined claims.

The principles of this invention having now been fully explained in connection with the foregoing, we hereby claim as our invention:

1. An electronic control system for monitoring the position of a moving member which is movable in opposite directions comprising:
   first means operatively coupled to said moving member for generating first signal information which varies in response to movement of said moving member, said first signal information being ambiguous as to the direction of movement of said moving member when said moving member is moving at speeds greater than a predetermined speed;
   second means operatively connected to said first means for generating second signal information indicative of which of the opposite directions of movement said movable member is moving in when said moving member is moving at speeds greater than said predetermined speed; and
   third means operatively connected to said first and second means for processing said first and second signal information to determine the position of said moving member without ambiguity and generating third signal information indicative of the position of said moving member which is usable for control purposes.

2. The invention according to claim 1 wherein said first means comprises:
   a clock for generating an output signal at fixed periodic intervals;

a feedback position counter having a predetermined count range for generating a position count (Nc) response to the output signal of said clock;

excitation means coupled to said feedback position counter for generating an excitation signal responsive to said position count;

a feedback device operatively coupled to said excitation means for providing a feedback signal which is phase shifted from said excitation signal in accordance with the displacement of said moving member; and a position storage device operatively coupled to said feedback device and to said feedback position counter for latching said position count therein responsive to said feedback signal from said feedback device and outputting a position number (Np) in accordance with said position count latched in said position storage device.

3. The invention according to claim 1 wherein said second means comprises a zero position counter for generating a zero position count (Nz) indicative of the net number of times and in which direction said first signal information goes through a least significant number.

4. The invention according to claim 3 wherein said zero position counter comprises a synchronous 4-bit bi-directional counter.

5. The invention according to claim 2 wherein said third means comprises a computer.

6. In an electronic control system for monitoring the position of a moving member which is movable in opposite directions, in combination:

first means having a predetermined count range for providing a position count number (Nc) related to the position of said moving member;

second means operatively connected to said first means to receive said position count number (Nc) and in response to movement of said moving member, providing a continuously updated position number (Np) related to the position of said moving member;

third means operatively coupled to said first and second means for generating a zero position count (Nz) indicative of the net number of times and in which direction the position number (Np) has passed through a least significant number; and fourth means operatively connected to said second and fourth means for processing said position number (Np) and said zero position count (Nz) to unambiguously determine the position of said moving member notwithstanding the speed of said moving member.

7. The invention according to claim 6 wherein said third means comprises a synchronous 4-bit bi-directional counter.

8. In an electronic control system for monitoring the position of a moving member which is movable in opposite directions, in combination:

first means including a feedback position counter having a predetermined count range for providing a position count number (Nc) related to the position of said moving member;

second means including a feedback device and a position storage device operatively connected to said first means and responsive to movement of said member for providing a continuously updated position number (Np) linearly related to the position of said moving member;

third means including a zero position counter device coupled to said feedback position counter and said position storage device for generating a zero position count (Nz) indicative of the net number of times and in which direction said position number (Np) has passed through a least significant number; and fourth means operatively connected to said second and said third means for processing said position number (Np) and said zero position count (Nz) to unambiguously determine the direction of movement of said moving member notwithstanding moving member speed and for generating output data indicative of the direction of movement of said moving member.

9. In an electronic control system for monitoring the position of a moving member which is movable in opposite directions, in combination:

a clock device for providing a continuous clock signal; a feedback position counter having a predetermined count range;

an exciter responsive to said feedback position counter, said feedback position counter operable to receive said clock signal from said clock device and to provide an exciter signal;

said feedback position counter being further operable to provide a position count number (Nc) related to the position of said moving member;

a feedback device for receiving said exciter signal from said exciter and responsive to movement of said moving member to provide a feedback signal;

a position storage device operatively connected to said feedback position counter to receive said position count number (Nc) therefrom and connected to said feedback device to receive said feedback signal therefrom for providing a continuously updated position number (Np) related to the position of said moving member;

a zero position counter operatively connected to receive said position count number (Nc) from said feedback position counter, operatively connected to receive said position number (Np) from said position storage device, and operatively connected to receive said feedback signal from said feedback device for determining the net number of times and direction said position number (Np) has passed through a least significant number between consecutive samples and for providing a zero position count number (Nz) indicative thereof; and computer means for processing said position number (Np) and said count number (Nz) to unambiguously determine the position of said moving member and notwithstanding the speed of said moving member.

10. An electronic control system for monitoring the position of a moving member movable in opposite directions comprising:

a clock device for providing a continuous clock signal;

an exciter device;

a feedback position counter having a predetermined count range for receiving said clock signal and for effecting an exciter signal from exciter device and for providing a position count number (Nc);

a feedback device responsive to movement of said moving member for receiving said exciter signal and for supplying a feedback signal;

a position storage device for receiving said position count number (Nc) and said feedback signal and for providing a continuously updated position number (Np) related to member position;

means including a zero position counter operatively connected for receiving said position count number (Nc), for receiving said position number (Np), for receiving said feedback signal, and for supplying a zero position count number (Nz) indicative of the net number of times and direction said position number (Np) passes through zero between consecutive samples; and computer means for processing said position number (Np) and said zero position count number (Nz) to unambiguously determine the direction of movement and the displacement of said moving member notwithstanding the speed of said moving member.

11. An electronic control system according to claim 10 wherein said zero position counter comprises a bi-directional binary counter.

12. For use with an electronic control system for monitoring the position of a movable member movable in opposite directions, comprised of:

a clock for generating a timing signal at fixed periodic intervals;

a feedback position counter for generating a count in response to said clock signal;

a feedback apparatus coupled to said moving member for generating a feedback signal indicative of the movement of said moving member;

a position storage device coupled to said feedback apparatus and to said feedback position counter for latching the count generated by said feedback position counter responsive to said feedback signal; and computer means coupled to said position storage device for periodically sampling said position storage device to determine the direction of movement of said moving member, the improvement comprising:

a zero position counter coupled to said feedback position counter, to said computer, and to said position storage device for determining the number of times and in which direction the count latched into said position storage device goes through a least significant number and supplying said computer witnh a zero position count indicative thereof to enable said computer to unambiguously determine the position of said moving member notwithstanding the speed of said moving member.

* * * * *